D. ASHWORTH.
Hose and Pipe Couplings.

No. 148,645. Patented March 17, 1874.

Witnesses.
Michael Ryan
Fred Haynes

Daniel Ashworth
by his Attorneys
Brown & Allen

UNITED STATES PATENT OFFICE.

DANIEL ASHWORTH, OF WAPPINGER'S FALLS, NEW YORK.

IMPROVEMENT IN HOSE AND PIPE COUPLINGS.

Specification forming part of Letters Patent No. 148,645, dated March 17, 1874; application filed February 26, 1874.

CASE B.

*To all whom it may concern:*

Be it known that I, DANIEL ASHWORTH, of Wappinger's Falls, in the county of Dutchess and State of New York, have invented certain Improvements in Hose and Pipe Couplings, of which the following is a specification:

This invention relates to certain improvements on that for which Letters Patent No. 144,943 were granted to me November 25, 1873, in which the coupling devices consisted of a pair of annular disks, each of which was formed with a hook-shaped lug and a notch, arranged at such points with relation to each other as to allow the lug on each disk to enter the notch on the opposite disk, and engage with an inclined surface, in order to couple and tighten two sections of hose or pipe.

The present invention consists in an abutment on the face of the inclined surface, with which the hooked lug engages for the purpose of preventing the improper disengagement of the lugs. The invention consists, further, in a rack or series of teeth or notches on the faces of the disks, for the purpose of tightening the joint by means of a suitable tool after the sections are coupled. The invention consists, further, in a packing of peculiar form, applied to the face of each of the annular disks, for the purpose of preventing leakage when the sections are coupled.

Figure 1:
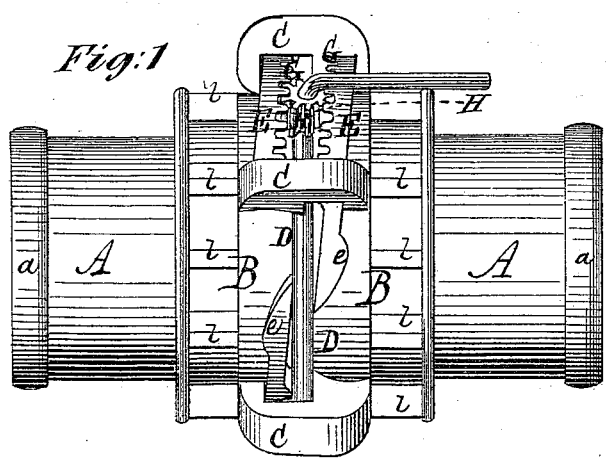
Figure 2:
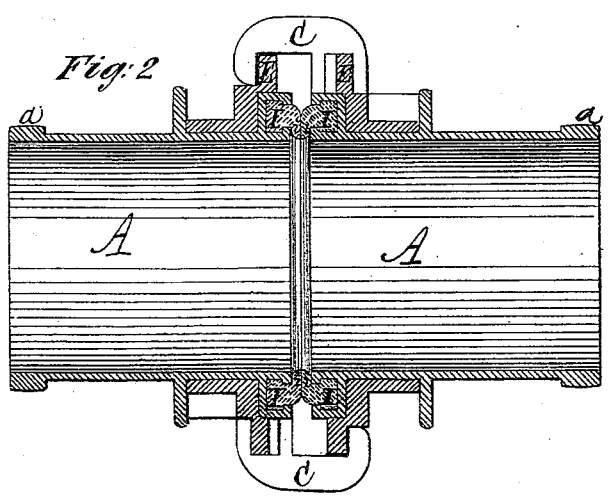
Figure 4:
Figure 3:
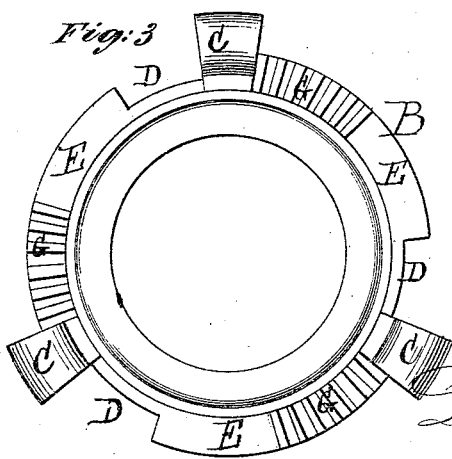

In the accompanying drawing, Figure 1 is a side view of my invention. Fig. 2 is a central longitudinal section. Fig. 3 is a face view of one of the annular disks. Fig. 4 is a detached view of the tool for tightening the joint.

In my patent aforesaid, it was stated that several series of lugs, notches, and inclines might be used on each plate or annular disk.

In the present invention, I have provided each plate or disk with three of said lugs, notches, and inclines, as shown in Figs. 1 and 3, in which B represents the disk, C the lug, D the notch, and E the incline. The neck A, which is attached to the end of the section of hose or pipe to be coupled, is formed with a collar, *a*, on the rear portion to prevent the hose from slipping off the neck. The disk B may be rigidly attached to the neck, or made in one piece with it; or it may be attached by means of a swivel-joint. When applied to hose, however, the swivel-joint is not necessary, as the flexibility of the hose will allow it to yield to the slight rotary motion of the disk in coupling. The engagement of the lugs with the notches and inclines is similar to that described in my patent aforesaid. The incline E has an abutment, *e*, near its point, formed by enlarging the metal of a portion of the incline, or by welding or otherwise attaching a piece. This abutment prevents the accidental disengagement of the lug from the incline after the sections have been coupled together, but allows of their disengagement by hand when it is desired to uncouple them—the abutment being tapered from the center toward the ends. On the faces of the disks B, opposite the inclined surfaces, are racks or series of teeth or notches G, which face each other when the sections are coupled together. These racks serve to facilitate the coupling and tightening of the sections by means of a suitable tool, (see Fig. 4,) consisting of a lever or bar with one end bent, and a pinion, H, formed thereon. By inserting the pinion between the racks, and moving the lever in the proper direction, the hooked lugs are caused to travel up the inclines and tighten the parts.

My improved packing consists of a rubber gasket, I, which is held in place by means of an annular groove in the face of the disk, the bottom of the groove being wider than the other portion, and the rear portion of the gasket being of corresponding form and pressed into place therein. The front or face portion of the gasket is formed with a flange, *i*, projecting inward, so that, when in place, there is a slight space between said flange and the face of the disk. When the sections are coupled together the gaskets face each other, as shown in Fig. 2, so that the pressure of the water in the hose or pipe has a tendency to press the flanges into close contact with each other, so as to form a tight joint and prevent leakage. If desired, the surfaces E may be parallel with the faces of the disks, instead of inclined, and the parts made to fit so closely that the pressure of the water upon the flanges will be sufficient to prevent leakage.

The necks A may have lugs or projections $l$ in rear of the disks to facilitate the turning of the same in coupling or uncoupling.

What I claim as new, and desire to secure by Letters Patent, is—

1. The abutments $e$ on the inclined surfaces E, substantially as shown and described, for the purpose specified.

2. The racks G opposite to each other on the disks B, in combination with the pinion H, substantially as shown and described, for the purpose specified.

3. The two internally-flanged gaskets I, in combination with each other and with the disks B of the coupling, substantially as shown and described.

DANIEL ASHWORTH.

Witnesses:
GEO. L. HOWARTH,
WILLIAM CHAPMAN.